US012763692B2

(12) United States Patent
Chen et al.

(10) Patent No.: US 12,763,692 B2
(45) Date of Patent: Oct. 13, 2026

(54) SINGLE-STAGE MULTI-OUTPUT SWITCHING POWER CONVERTER

(71) Applicant: Renesas Design (UK) Limited, Bourne End (GB)

(72) Inventors: Yimin Chen, Campbell, CA (US); Guoxiong Chen, Campbell, CA (US); Yong Li, Campbell, CA (US); John Kesterson, Chandler, AZ (US)

(73) Assignee: Renesas Design (UK) Limited, Bourne End (GB)

( * ) Notice: Subject to any disclaimer, the term of this patent is extended or adjusted under 35 U.S.C. 154(b) by 188 days.

(21) Appl. No.: 18/896,673

(22) Filed: Sep. 25, 2024

(65) Prior Publication Data

US 2026/0088723 A1 Mar. 26, 2026

(51) Int. Cl.
*H02M 3/335* (2006.01)
*H02M 1/00* (2006.01)

(52) U.S. Cl.
CPC ..... *H02M 3/33561* (2013.01); *H02M 1/0025* (2021.05); *H02M 3/33523* (2013.01); *H02M 3/33592* (2013.01)

(58) Field of Classification Search
CPC ........... H02M 3/33561; H02M 1/0025; H02M 3/33592; H02M 3/335
See application file for complete search history.

(56) References Cited

U.S. PATENT DOCUMENTS

| | | | | |
|---|---|---|---|---|
| 7,505,288 | B2 * | 3/2009 | Duvnjak | H02M 3/33561 363/21.18 |
| 10,218,282 | B1 * | 2/2019 | Moore | H02M 1/08 |
| 2003/0174525 | A1 * | 9/2003 | Ingman | H02M 7/217 363/90 |
| 2007/0121350 | A1 * | 5/2007 | Duvnjak | H02M 3/33561 363/21.01 |
| 2009/0134702 | A1 * | 5/2009 | Duvnjak | H02M 3/33561 363/21.01 |
| 2012/0062031 | A1 | 3/2012 | Buthker | |
| 2012/0218784 | A1 * | 8/2012 | Duvnjak | H02M 3/33561 363/21.01 |
| 2013/0154507 | A1 | 6/2013 | Gilliom | |
| 2018/0159434 | A1 * | 6/2018 | Werner | H05B 45/385 |
| 2020/0251995 | A1 * | 8/2020 | Seeman | H02M 3/1584 |
| 2020/0313561 | A1 * | 10/2020 | Moore | H02M 3/33561 |
| 2022/0158564 | A1 * | 5/2022 | Li | H02M 3/33561 |
| 2025/0132674 | A1 * | 4/2025 | Khan | H02M 1/009 |
| 2025/0192686 | A1 * | 6/2025 | Moore | H02M 3/33592 |

FOREIGN PATENT DOCUMENTS

DE 10259353 A1 7/2004

OTHER PUBLICATIONS

Huang, Ming-Hsin et al., "Single-Inductor Multi-Output (SIMO) DC-DC Converters With High Light-Load Efficiency and Minimized Cross-Regulation for Portable Devices" Apr. 2009, vol. 44, Issue: 4, IEEE Journal of Solid-State Circuits.

Office Action—Application No. 102024139803.5—Apr. 8, 2025.

* cited by examiner

*Primary Examiner* — Yusef A Ahmed
(74) *Attorney, Agent, or Firm* — Haynes and Boone, LLP

(57) ABSTRACT

A single-stage multiple-output switching power converter is provided that includes a switch in each output. A secondary controller controls the switches to distribute a secondary winding current to the multiple outputs so as to regulate a different output voltage at each multiple output.

14 Claims, 6 Drawing Sheets

SINGLE-STAGE MULTI-OUTPUT SWITCHING POWER CONVERTER

TECHNICAL FIELD

This application relates to switching power converters, and more particularly to a single-stage multi-output switching converter.

BACKGROUND

The universal serial bus (USB) standard has evolved from primarily providing data communication with a limited capability for power delivery to becoming a primary provider of power that includes a data interface. In particular, a USB Power Delivery (USB-PD) standard has been developed that supports power delivery up to 240 watts at a 48 V output over a USB type-C cable. In addition, USB-PD supports a flexible power delivery such that the client devices may negotiate for a desired output voltage and output current profile. The resulting flexibility of the USB-PD standard supports efficient and fast charging of portable device batteries and other loads.

Given these advantages of USB-PD, the standard is expanding to include not only the charging of smartphones, tablets, and laptops but also the charging of battery-operated appliances and tools. As a result, cordless tools (e.g., cordless drills and lawnmowers) and household appliances such as battery-operated vacuum cleaners are migrating to receiving their power delivery through a type-C USB cable as supported by USB-PD. The resulting widespread adoption of USB-PD drives the need for multiple-port (multi-output) switching power converters.

SUMMARY

In accordance with an aspect of the disclosure, a single-stage multiple-output switching power converter is provided that includes: a transformer having a primary winding and a secondary winding; a plurality of outputs coupled to the secondary winding, each output including a serial combination of a rectifier, a switch, and an output terminal; and a secondary controller configured to control the switch in each output to regulate a corresponding output voltage at each output terminal.

In accordance with another aspect of the disclosure, a switching power converter method is provided that includes: cycling off a power switch transistor coupled to a primary winding of a transformer following a first on-time of the power switch transistor; switching on a first switch after the first on-time, wherein the first switch couples to a secondary winding of the transformer through a first rectifier to distribute a first portion of a secondary winding current to a first output terminal; switching off the first switch responsive to a first output voltage at the first output terminal exceeding a first reference voltage; and switching on a second switch coupled to the secondary winding of the transformer through a second rectifier to distribute a second portion of the secondary winding current to a second output terminal.

In accordance with yet another aspect of the disclosure, a single-stage multiple-output switching power converter is provided that includes: a transformer including a primary winding and a secondary winding; a first rectifier and a first switch coupled in series between the secondary winding and a first output terminal; a second rectifier and a second switch coupled in series between the secondary winding and a second output terminal; a first loop compensator configured to process a first error voltage equaling a difference between a first reference voltage and a voltage of the first output terminal into a first control voltage; a second loop compensator configured to process a second error voltage equaling a difference between a second reference voltage and a voltage of the second output terminal into a second control voltage; and a control voltage circuit configured to form a combined control voltage from a function of the first control voltage and of the second control voltage.

These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

A multi-output power adapter such as a USB-PD multi-port adapter supports the simultaneous charging of multiple portable devices. Each port of the multi-output power adapter may provide an individual voltage/current profile depending upon the needs of the corresponding portable device coupled to the port. It is thus conventional for each port of a multi-output USB-PD adapter to have an individual switching power converter stage to support the regulation of the corresponding voltage and current profile. But an initial switching power stage is required to accommodate the regulation of an DC voltage supplied to the various second stage switching power converters. The two stages for each output port introduce efficiency losses since each switching power converter stage introduces some loss. For example, should the initial AC/DC switching power converter stage have an 80% operating efficiency and a second DC/DC switching power converter stage have an 85% operating efficiency, the net operating efficiency of the two stages would be only 68%.

To increase the net operating efficiency, a single-stage multi-output switching power adapter is disclosed in which an AC/DC switching power converter is the only switching power converter stage. The AC/DC switching power converter includes a power switch coupled to a primary winding of a transformer. While the power switch is on, a primary current develops in the primary winding. A secondary winding of the transformer does not conduct while the primary current conducts. But when the primary switch switches off to stop the conduction of the primary current, a secondary current begins to conduct in the secondary winding. A secondary-side controller controls the distribution of the secondary current to the various multiple outlets. To allow this control, each output terminal of the multi-output switching power adapter couples to the secondary winding through a transistor switch and a rectifier. In one implementation, each rectifier may comprise a diode having an anode coupled to the secondary winding and a cathode coupled to the corresponding transistor switch. In another implementation, each rectifier may comprise a synchronous rectifier transistor. Each output terminal couples to ground through a corresponding output capacitor to stabilize the corresponding output voltage.

Figure 1:
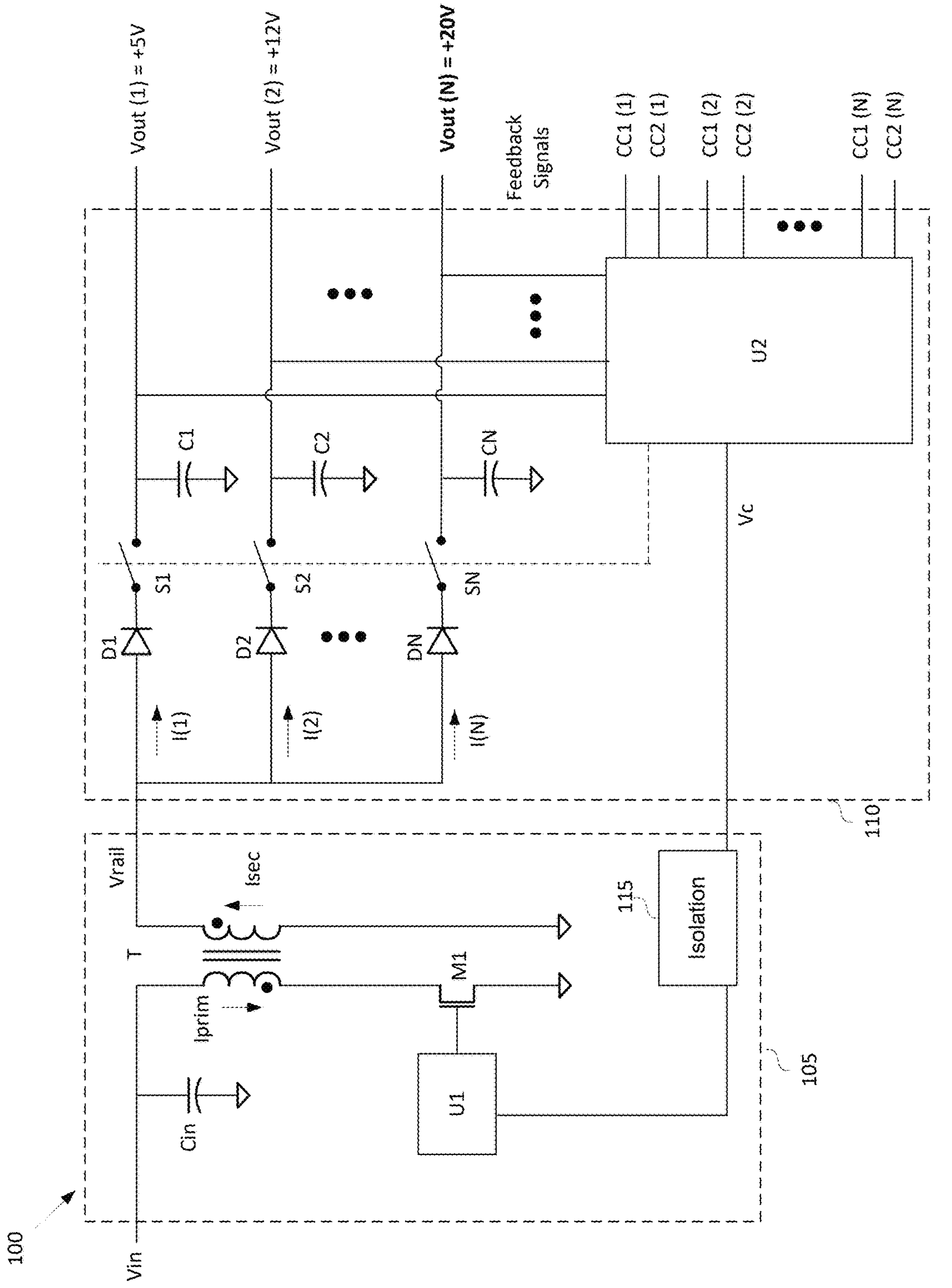
FIG. 1 illustrates a single-stage multi-output switching power converter in accordance with an aspect of the disclosure.

In one implementation, the secondary-side controller controls the transistor switches so that only one is on at any given time while the secondary current conducts in the off-time of a cycle of the power switch transistor. The secondary current is thus demultiplexed to the various outputs depending upon which switch is on while the remaining switches are off. An example single stage multi-output switching power converter 100 is shown in FIG. 1. A single power stage 105 receives a rectified input voltage Vin such as from a diode bridge processing an AC input voltage (not illustrated) that drives a primary current (Iprim) into a primary winding of a transformer T when a n-type metal-oxide semiconductor (NMOS) power switch transistor M1 switches on. An input capacitor Cin that couples between ground and a voltage rail for the input voltage functions to smooth the input voltage. A source of the power switch transistor M1 couples to ground whereas a drain of the power switch transistor M1 couples to the primary winding. A primary-side controller U1 drives a gate voltage of the power switch transistor M1 to control the cycling of the power switch transistor M1. A secondary winding of the transformer T couples between ground and a voltage rail (Vrail).

A plurality 110 of n USB-PD interfaces couple to the voltage rail, where n is a plural positive integer. Each USB-PD interface includes a serial combination of a rectifier such as a diode or a synchronous-rectifier transistor and a switch (e.g., a switch transistor) coupled between an output terminal and the secondary winding. In addition, each USB-PD interface includes an output capacitor coupled between the interface's output terminal and ground. For example, a first USB-PD interface includes a first rectifier such as a diode D1 having an anode coupled to the voltage rail and a cathode coupled to a first switch S1 (e.g., a transistor switch). The first switch S1 also couples to a first output voltage terminal providing a first output voltage Vout(1). A first output capacitor C1 couples between the first output voltage terminal and ground to smooth the first output voltage. Similarly, a second USB-PD interface includes a second rectifier such as a second diode D2 having an anode coupled to the voltage rail and a cathode coupled to a second switch S2. The second switch S2 also couples to a second output voltage terminal providing a second output voltage Vout(2). A second output capacitor C2 couples between the second output voltage terminal and ground to smooth the second output voltage. Finally, an nth USB-PD interface includes an nth rectifier such as a synchronous rectifier transistor MN coupled to an nth switch SN. The nth switch SN also couples to an nth output voltage terminal providing an nth output voltage Vout(n). An nth output capacitor CN couples between the nth output voltage terminal and ground to smooth the nth output voltage. The use of synchronous rectifier transistors instead of diodes reduces loss. Conversely, the use of diodes instead of synchronous rectifier transistors reduces the control complexity.

A secondary controller U2 controls the on and off states of the switches S1 through SN during the off-time of the power switch transistor M1 while a secondary winding current conducts to regulate the output voltages Vout(1) through Vout(N). Should the rectifier in each USB output be a synchronous rectifier transistor such as the transistor MN, the secondary controller U2 also functions as a synchronous rectifier controller to control the on/off state of the synchronous rectifier transistors. Since synchronous rectifier control is known in the flyback arts, the following discussion will focus on the control of the switches S1 through SN. For example, the secondary controller U2 may control the on-time of the switch S1 so that the output voltage Vout(1) is regulated to equal 5V. Similarly, the secondary controller U2 may control the on-time of the switch S2 so that the output voltage Vout(2) is regulated to equal 12V. Finally, the secondary controller U2 may control the on-time of the switch SN so that the output voltage Vout(N) is regulated to equal 20V. It will be appreciated that these various output voltages are merely exemplary and may be regulated to equal other values in alternative implementations. To monitor whether each USB-PD interface is active, the secondary controller U2 also monitors the CC terminals for each interface as known in the USB arts. The secondary controller U2 thus monitors a pair of terminals CC1(1) and CC2(1) for the first USB-PD interface, a pair of terminals CC1(2) and CC2(2) for the second USB-PD interface, and so on such that the secondary controller U2 monitors a pair of terminals CC1(N) and CC2(N) for the Nth USB-PD interface.

The secondary controller U2 may regulate the output voltages using one of several control methods that are summarized as follows. In a first control method implementation, the secondary winding current is distributed to each USP-PD interface. The order of this current distribution may be based on the regulated value of the output voltage corresponding to the USB-PD interface. In the first method, the distribution order may be based upon the magnitude of the output voltages, with the secondary winding current being first distributed to the USB-PD interface with the lowest output voltage such that the order follows the order of the successively-larger output voltages. For example, in the switching power converter 100, as the power switch transistor M1 cycles off and the secondary winding current pulses high, the secondary controller U2 may first switch on switch S1 to distribute energy to the 5V output terminal. Once the output voltage Vout(1) reaches 5V, the secondary controller U2 switches off switch S1 and switches on switch S2 to distribute energy to the 12V output terminal. Once the output voltage Vout(2) reaches 12V, the secondary controller U2 switches off switch S2 and switches on switch S3 to distribute energy to the 20V output terminal. The secondary controller U2 keeps switch S3 on until the secondary winding current has ramped down to zero. The secondary controller U2 may then develop an error voltage based on the difference between Vout(3) and the corresponding reference voltage. The error voltage is then processed into a control voltage signal that is transmitted over a ground-isolating channel 115 (for example, an opto-isolator or a capacitive channel) to the primary controller U1. The primary controller U1 may then control the cycling of the power switch transistor M1 responsive to the control voltage signal. Alternatively, the secondary controller U2 may instead process the control voltage signal into an on/off command for the power switch transistor M1 that is transmitted over the ground-isolating channel 115. The primary controller U1 in such an implementation would then respond to the on/off command to control the power switch transistor M1 accordingly.

Figure 2:
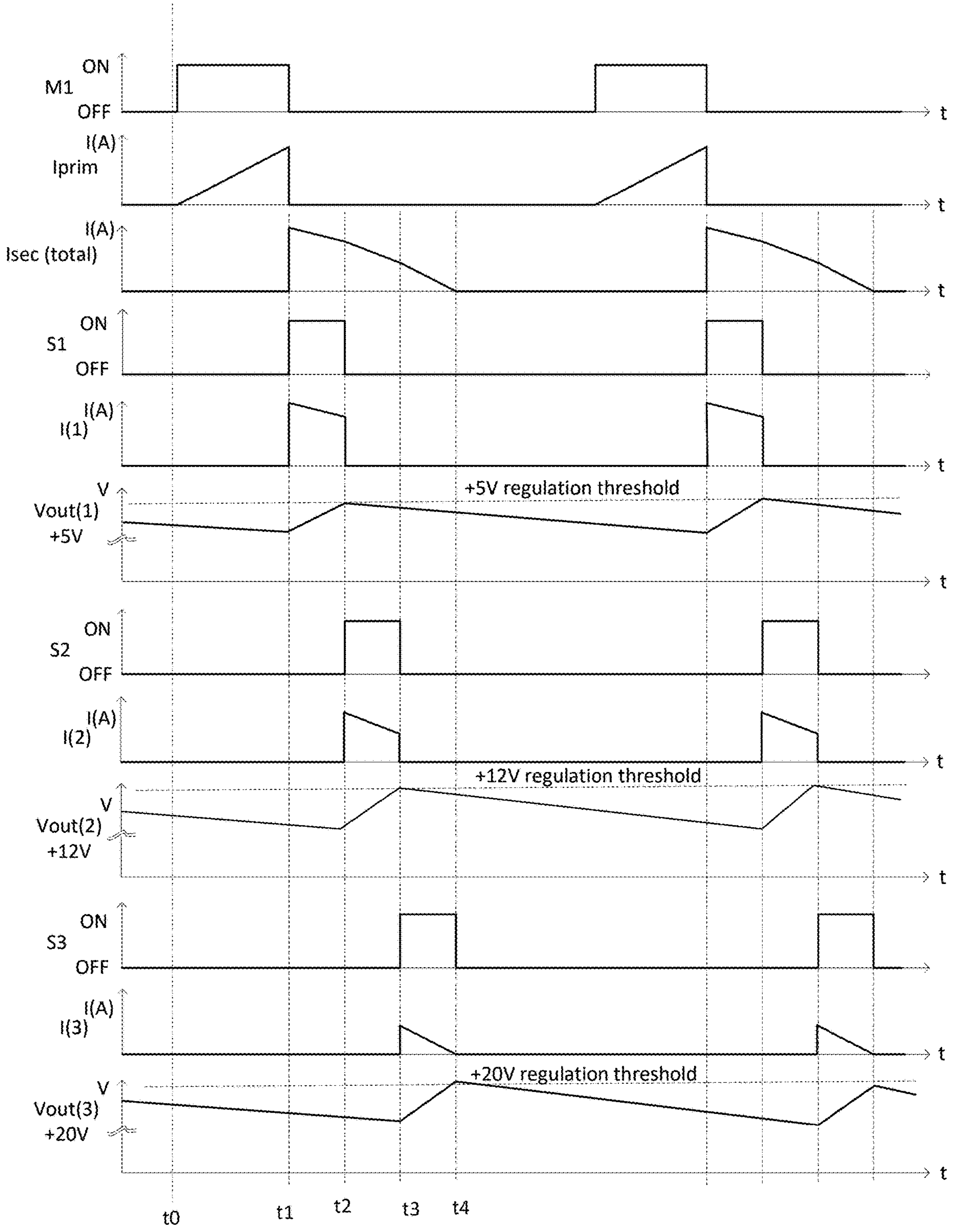
FIG. 2 illustrates some operating waveforms for the switching power converter of FIG. 1 in an implementation in which the secondary winding current is distributed to the multiple output terminals in order of their output voltage magnitudes (a smallest magnitude being first).

Some example waveforms for the switching power converter 100 when operating according to the first control method are shown in FIG. 2. In a first power switch cycle, the power switch transistor M1 is switched on at a time t0 to cause the primary winding current (Iprim) to ramp up to a peak value at a time t1, whereupon the power switch transistor M1 is switched off and the secondary current (Isec) pulses high.

At time t1, the secondary controller U2 switches the switch S1 on to conduct a current I(1) to the output terminal for Vout(1). The output voltage Vout(1) then begins to increase until it reaches the desired value of 5V at a time t2, which causes the secondary controller U2 to switch off the switch S1 and switch on the switch S2 to cause switch S2 to conduct a current I(2) to the output terminal for Vout(2).

At time t2, the output voltage Vout(2) then begins to increase until it reaches the desired value of 12V at a time t3, which causes the secondary controller U2 to switch off the switch S2 and switch on the switch S3 to cause the switch S3 to conduct a current I(3) to the output terminal for Vout(3). The output voltage Vout(3) then begins to increase until it reaches the desired value of 20V at a time t4, whereupon the secondary current has ramped down to zero. In a second cycle of the power switch transistor M1, the secondary current is again distributed in order analogously as discussed for the first cycle.

In an alternative second control method, the distribution order may be based on the error voltage for each USB-PD interface (the error voltage being the difference between the desired output voltage (Vref) and the actual output voltage). The interface with the largest error may receive energy first from the secondary winding current, then the next-largest, and so on such that the interface with the lowest error receives energy last. The largest error may be based upon the error voltage magnitude or based upon a ratio of the error voltage divided by the reference voltage for each interface.

In a third control method, the first or second methods may be used except that USB-PD interfaces that are at or above their desired value will be skipped and not receive energy while the secondary current ramps down to zero from its pulsed-high value. Such an over-voltage condition may occur when the output load current is very low (or at a no-load condition).

Figure 3:
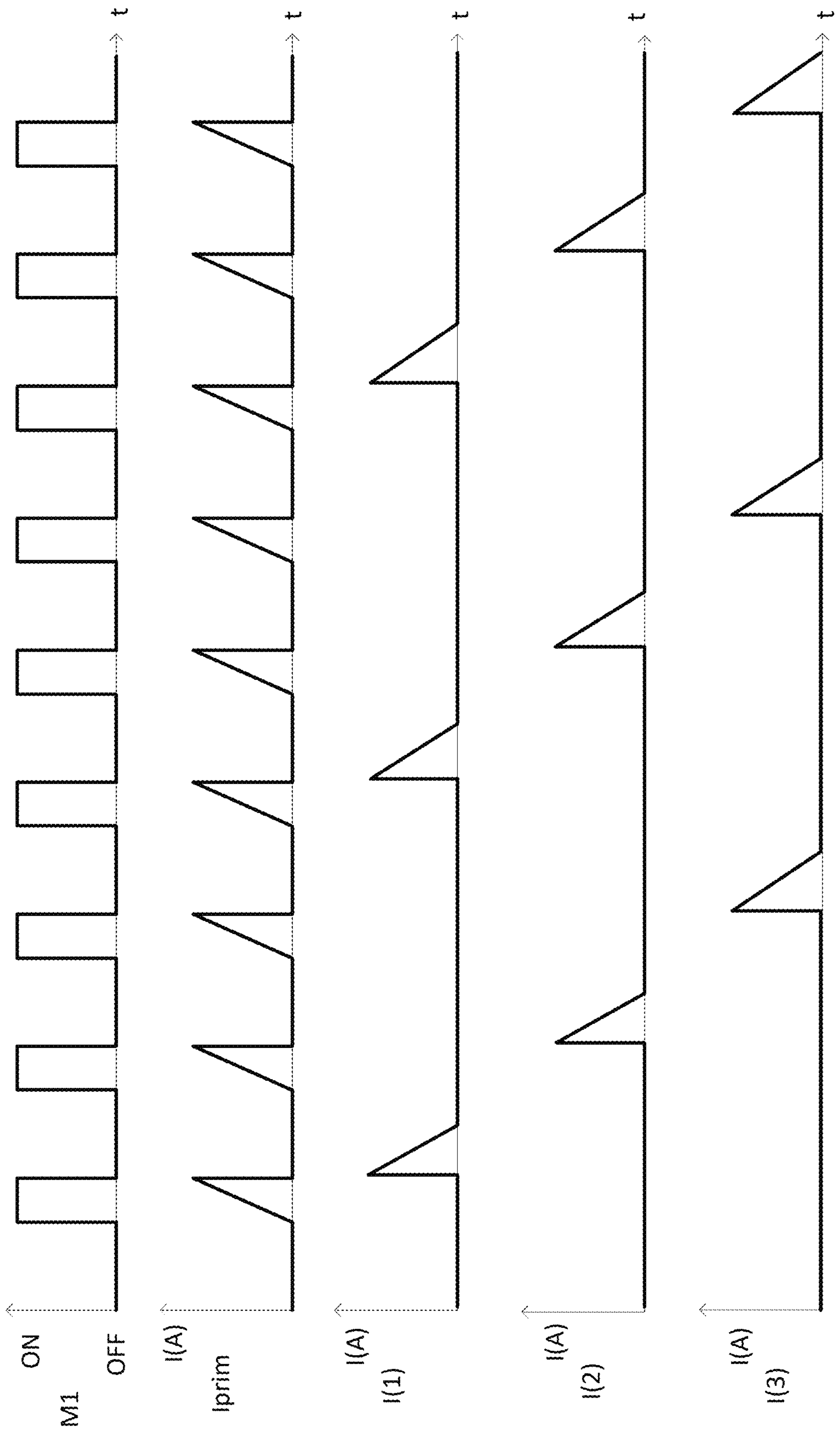
FIG. 3 illustrates some operating waveforms for the switching power converter of FIG. 1 in an implementation in which the secondary winding current is distributed to the multiple output terminals in a round-robin order.

In a fourth control method, a round-robin order may be used. For example, energy may first be delivered to a first interface for a first power switch cycle, then to a second interface for a second power switch cycle, next to a third interface for a third power switch cycle, and so on. Some example operating waveforms for the fourth method are shown in FIG. 3. In a first power switch cycle, the power switch transistor M1 is cycled on to cause the primary winding current (Iprim) to ramp to a peak value. The power switch transistor M1 is then cycled off. The secondary controller U2 then switches on the switch S1 to cause the secondary winding current to ramp down entirely as the current I(1). In a second cycle of the power switch transistor M1, the power switch transistor M1 is again cycled off after the primary winding current reaches a peak value. The secondary controller U2 then switches on the switch S2 to cause the secondary winding current to ramp down entirely as the current I(2). In a third cycle of the power switch transistor M1, the power switch transistor M1 is again cycled off after the primary winding current reaches a peak value. The secondary controller U2 then switches on the switch S3 to cause the secondary winding current to ramp down entirely as the current I(3). The same round-robin order is used over the remaining cycles of the power switch transistor M1 in FIG. 3.

Figure 4:
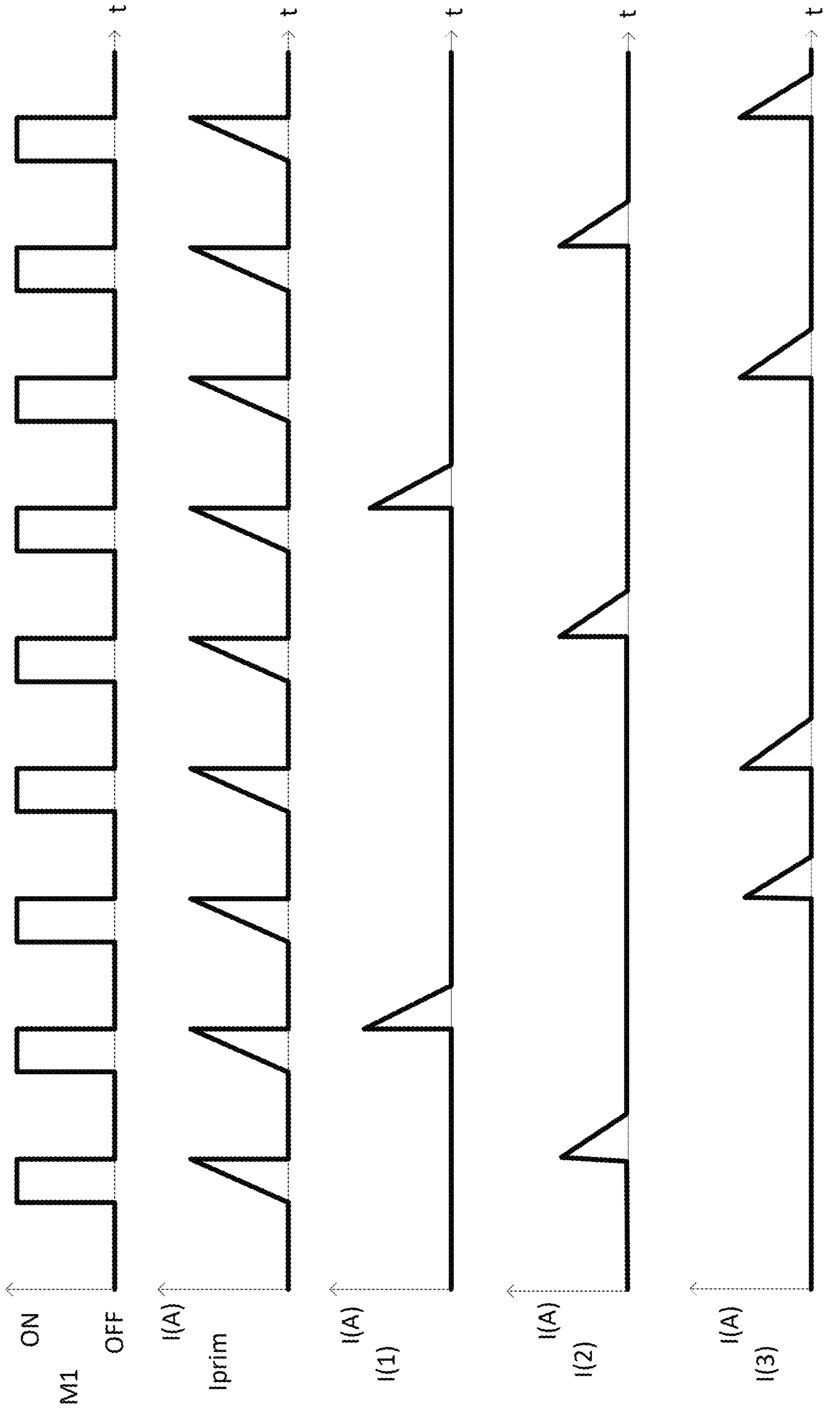
FIG. 4 illustrates some operating waveforms for the switching power converter of FIG. 1 in an implementation in which the secondary winding current is distributed to the multiple output terminals in order of their error voltages.

In a fifth control method, energy is delivered solely to the USB-PD interface with the greatest error magnitude (the output voltage minus the interface's reference voltage). Alternatively, the energy may be delivered solely to the USB-PD interface with the largest relative error such as based on a ratio of the error voltage divided by the reference voltage for the corresponding USB-PD interface. Some example operating waveforms for the fifth control method are shown in FIG. 4. In a first power switch cycle, the power switch transistor M1 is cycled on to cause the primary winding current (Iprim) to ramp to a peak value. The power switch transistor M1 is then cycled off. In this first switching cycle, it is the second USB-PD interface that has the largest error voltage. The secondary controller U2 thus switches on the switch S2 to cause the secondary winding current to ramp down entirely as the current I(2). In a second power switch cycle, the power switch transistor M1 is again cycled on to cause the primary winding current (Iprim) to ramp to a peak value. The power switch transistor M1 is then cycled off. In the second switching cycle, it is the first USB-PD interface that has the largest error voltage. The secondary controller U2 thus switches on the switch S1 to cause the secondary winding current to ramp down entirely as the current I(1). In both a third and a fourth switching cycle, it is the third USB-PD interface that has the largest error voltage. The secondary controller U2 thus switches on the switch S3 to cause the secondary winding current to ramp down entirely as the current I(3) in these switching cycles. In a fifth switching cycle, it is the second USB-PD interface that has the largest error voltage, and so on. Finally, in a sixth control method in which all the USB-PD outputs are at or above an over-voltage threshold, energy may be delivered to one or more outputs and subsequent power switch cycles may be skipped.

Figure 5:
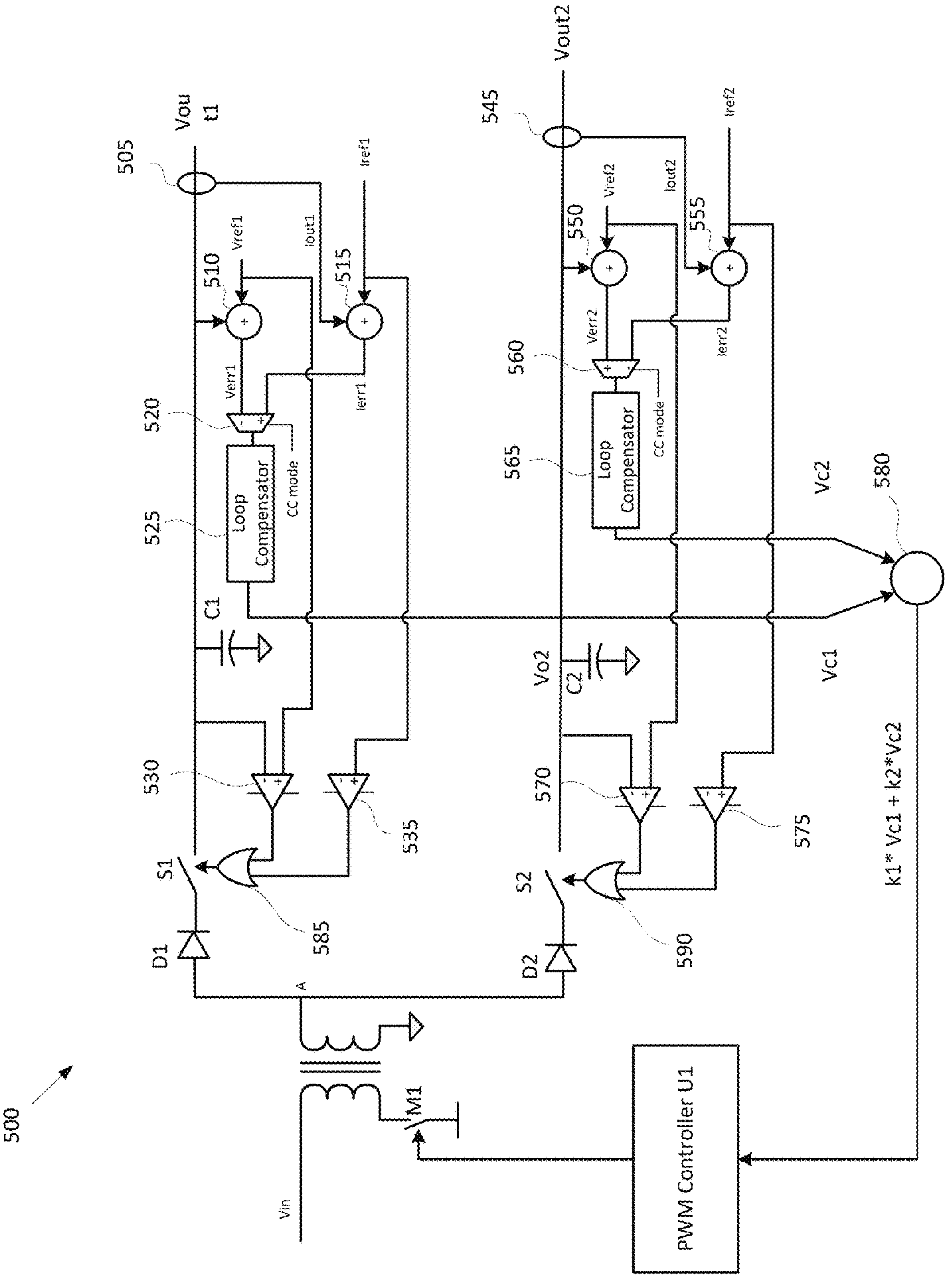
FIG. 5 illustrates a single-stage two-output switching power converter in accordance with an aspect of the disclosure.

A switching power converter 500 that controls a first USB-PD interface having an output voltage Vout1 and a second USB-PD interface having an output voltage Vout2 is shown in more detail in FIG. 5. In the first USB-PD interface during a constant current mode, a current sense circuit 505 (for example, a sense resistor) senses the output current Iout1 so that an error current Ierr1 may be calculated in a subtractor 515 as the difference between a reference current Iref1 and the output current Iout1. Similarly, a subtractor 510 determines an error voltage Verr1 as the difference between a reference voltage Vref1 and the output voltage Vout1. A multiplexer 520 selects between the error voltage Verr1 and the error current Ierr1 depending upon which mode of operation (constant voltage or constant current) is active to provide the corresponding error signal to a first loop compensator 525 for the first USB-PD interface. The first loop compensator 525 processes the selected error signal to produce a first control voltage Vc1. To control the switch S1 during the constant voltage mode, a comparator 530 compares the output voltage Vout1 to the reference voltage Vref1. Should the output voltage Vout1 be greater than the reference voltage Vref1, the comparator 530 asserts its output signal. Similarly, a comparator 535 compares the output current Iout1 to the reference current Iref1 during the constant current mode. Should the output current Iout1 be greater than the reference current Iref1, the comparator 535 asserts its output signal. An OR gate 585 ORs the comparator output signals to control the on/off state of the switch S1.

The second USB-PD interface is controlled analogously. During a constant current mode, a current sense circuit 545 (for example, a sense resistor) senses the output current Iout2 so that an error current Ierr2 may be calculated in a subtractor 555 as the difference between a reference current Iref2 and the output current Iout2. Similarly, a subtractor 550 determines an error voltage Verr2 as the difference between a reference voltage Vref2 and the output voltage Vout2. A multiplexer 560 selects between the error voltage Verr2 and the error current Ierr2 depending upon mode of operation (constant voltage or constant current) is active to provide the corresponding error signal to a second loop compensator 565 for the second USB-PD interface. The second loop compensator 565 processes the selected error signal to produce a second control voltage Vc2. To control the switch S2 during the constant voltage mode, a comparator 570 compares the output voltage Vout2 to the reference voltage Vref2. Should the output voltage Vout2 be greater than the reference voltage Vref2, the comparator 570 asserts its output signal. Similarly, a comparator 575 compares the output current Iout2 to the reference current Iref2 during the constant current mode. Should the output current Iout2 be greater than the reference current Iref2, the comparator 575 asserts its output signal. An OR gate 590 ORs the comparator output signals to control the on/off state of the switch S2. A control voltage circuit 580 forms a combined control voltage that equals a sum of k1*Vc1 and k2*Vc2, where k1 and k2 are proportionality constants. In one implementation, the constants k1 and k2 may each be unity such that the control voltage circuit 580 functions as an adder. More generally, the constants range between zero and one depending upon, for example, the relative magnitudes of the output voltages and/or the relative magnitudes of the error voltages. The combined control voltage propagates to the primary controller U1 through the ground-isolating channel (not illustrated). In one implementation, the primary controller U1 pulse-width modulates (PWM) the cycling of the power switch transistor M1 responsive to the combined control voltage. Alternatively, the primary controller U1 may pulse frequency modulate (PFM) the cycling of the power switch transistor M1 responsive to the combined control voltage.

Figure 6:
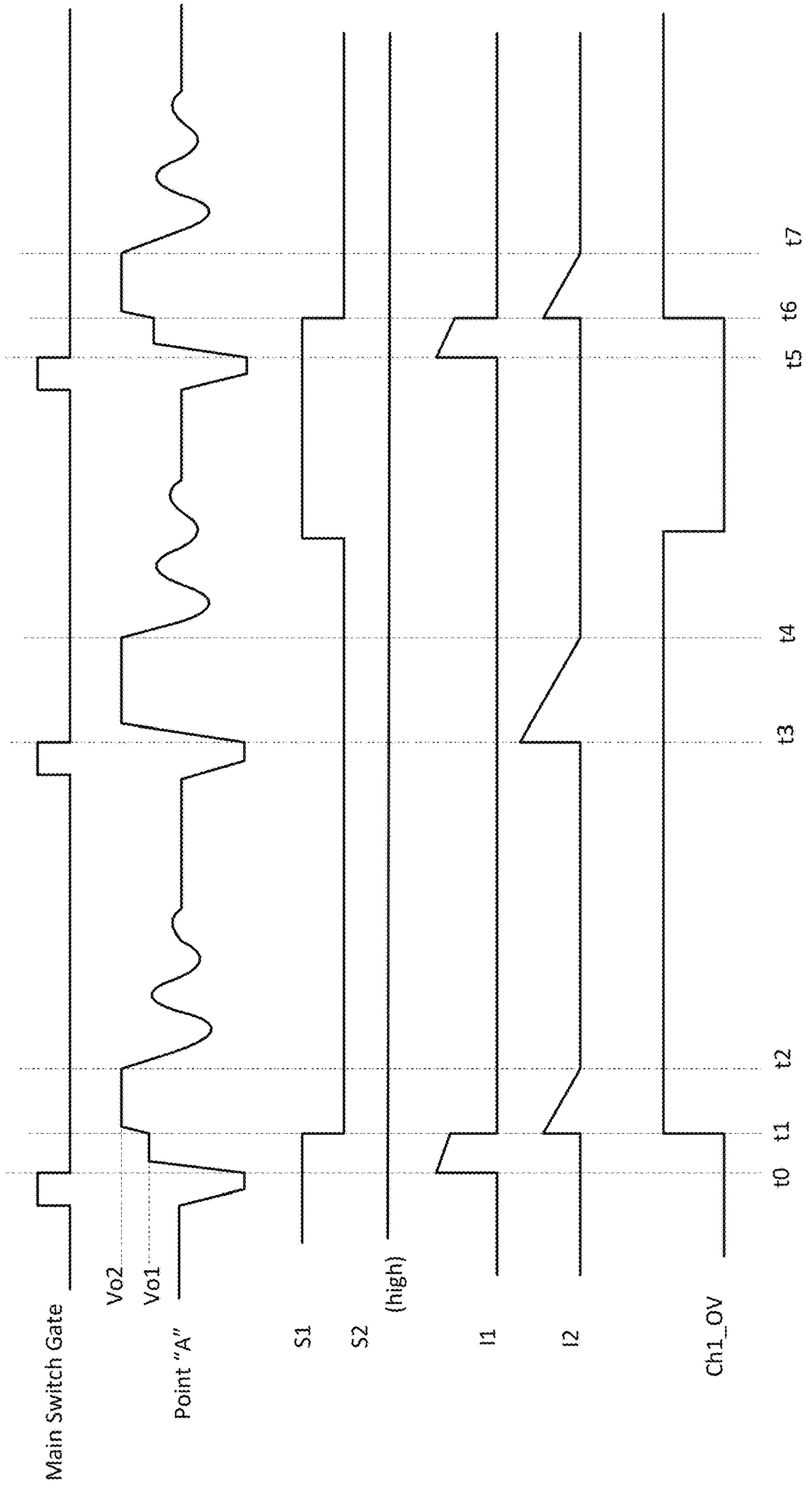
FIG. 6 illustrates some operating waveforms for the switching power converter of FIG. 5 in an implementation in which the secondary winding current is distributed to the multiple output terminals in order of their output voltage magnitudes (a smallest magnitude being first).

The switching power converter 500 may utilize any of the control methods discussed herein. Some example operating waveforms for the switching power converter 500 are shown in FIG. 6 in an implementation using the first control method for a constant voltage mode of operation. Since the regulated value of the output voltage Vout1 is less than that of the output voltage Vout2, the secondary winding current will first be distributed to the first USB-PD interface. But this distribution depends upon whether an over-voltage (OV) output signal CH1_OV of the comparator 530 is asserted or not, which in turn depends upon whether the output voltage Vout1 is greater than the reference voltage Vref1. For example, the power switch off time in a first cycle of the power switch transistor (main switch gate) occurs at a time t0. At that time, the signal CH1_OV is de-asserted so the switch S1 is on. The secondary current is then distributed as the output current I1 to the first USB-PD interface until the CH1_OV signal is asserted at a time t1. The secondary current then continues to ramp down to zero through the second USB-PD interface as the current I2 until it ramps to zero at a time t2. The input voltage to the rectifiers for the first and second USB-PD interfaces is indicated in FIG. 6 as a point A voltage. The point A voltage is grounded while the main switch gate is asserted and jumps to equal Vout1 (Vo1) at time t1 and to equal Vout2 (Vo2) at time t2. The point A voltage then begins to resonantly oscillate in a discontinuous conduction mode of operation until the resonance stops prior to the cycling on of the power switch transistor M1 in a second cycle. The power switch transistor M1 cycles off at a time t3. But the Ch1_OV signal is still asserted at time t3, so the secondary winding current is distributed to the second USB-PD interface as the current I2. The current I2 ramps down to zero at a time t4, whereupon the point A voltage again begins to resonantly oscillate. An on-time in a third cycle of the power switch transistor M1 ends a time t5. The Ch1_OV signal is de-asserted at time t5, so the secondary winding current is distributed to the first USB-PD interface as the current I1. At a time t6, the Ch1_OV signal is asserted to cause the switch S1 to turn off. The current I2 then ramps to zero at a time t7.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A single-stage multiple-output switching power converter, comprising:
- a transformer having a primary winding and a secondary winding;
- a plurality of outputs coupled to the secondary winding, each output of the plurality of outputs including a loop compensator configured to convert an error voltage of the output into a control voltage and including a serial combination of a rectifier, a secondary switch, and an output terminal;
- a secondary controller configured to control the secondary switch for each output of the plurality of outputs to regulate a corresponding output voltage at each corresponding output terminal;
- a power switch transistor coupled between the primary winding and ground, wherein the secondary controller is further configured to control each secondary switch to distribute a secondary winding current to the plurality of outputs in an order during an off-time of the power switch transistor;
- a primary controller configured to control a cycling of the power switch transistor;
- a ground-isolating channel coupled between the primary controller and the secondary controller; and
- an adder configured to add the control voltage for each output of the plurality of outputs to form a combined control voltage that is transmitted over the ground-isolating channel to the primary controller.

2. The single-stage multiple-output switching power converter of claim 1,
- wherein the order is determined according to a magnitude of each corresponding output voltage.

3. The single-stage multiple-output switching power converter of claim 1, wherein the order is determined according to a magnitude of the error voltage for each output of the plurality of outputs.

4. The single-stage multiple-output switching power converter of claim 1, wherein each output of the plurality of outputs is a USB-PD output.

5. The single-stage multiple-output switching power converter of claim 1, wherein the primary controller is further configured to control the cycling of the power switch transistor according to a pulse-width modulation that is responsive to the combined control voltage.

6. A switching power converter method, comprising:

cycling off a power switch transistor coupled to a primary winding of a transformer following a first on-time of the power switch transistor, wherein the power switch transistor is maintained off for an off-time;

switching on a first switch after the first on-time, wherein the first switch is coupled to a secondary winding of the transformer through a first rectifier to distribute a first portion of a secondary winding current to a first output terminal during a first portion of the off-time;

switching off the first switch responsive to a first output voltage at the first output terminal exceeding a first reference voltage;

switching on a second switch coupled to the secondary winding of the transformer through a second rectifier to distribute a second portion of the secondary winding current to a second output terminal during a second portion of the off-time;

forming a first error voltage equaling a difference between the first reference voltage and the first output voltage;

processing the first error voltage through a first loop compensator to form a first control voltage;

forming a second error voltage equaling a difference between a second reference voltage and a second output voltage at the second output terminal;

processing the second error voltage through a second loop compensator to form a second control voltage; and forming a combined control voltage from a function of the first control voltage and of the second control voltage.

7. The switching power converter method of claim 6, further comprising:

maintaining an on-state of the second switch while the secondary winding current ramps down to zero.

8. The switching power converter method of claim 6, further comprising:

cycling off the power switch transistor following a second on-time of the power switch transistor;

maintaining an off-state of the first switch responsive to the first output voltage exceeding the first reference voltage; and switching on the second switch following the second on-time.

9. The switching power converter method of claim 6, further comprising:

transmitting the combined control voltage through a ground-isolating channel to a primary controller to control the cycling of the power switch transistor.

10. A single-stage multiple-output switching power converter, comprising:

a transformer including a primary winding and a secondary winding;

a first rectifier and a first switch coupled in series between the secondary winding and a first output terminal;

a second rectifier and a second switch coupled in series between the secondary winding and a second output terminal;

a first loop compensator configured to process a first error voltage equaling a difference between a first reference voltage and a voltage of the first output terminal into a first control voltage;

a second loop compensator configured to process a second error voltage equaling a difference between a second reference voltage and a voltage of the second output terminal into a second control voltage;

a control voltage circuit configured to form a combined control voltage from a function of the first control voltage and of the second control voltage;

a power switch transistor coupled between the primary winding and ground;

a primary controller configured to control a cycling of the power switch transistor responsive to the combined control voltage;

a ground-isolating channel coupled between the control voltage circuit and the primary controller;

a first comparator configured to compare the first reference voltage to the voltage of the first output terminal to control a cycling of the first switch; and a second comparator configured to compare the second reference voltage to the voltage of the second output terminal to control a cycling of the second switch.

11. The single-stage multiple-output switching power converter of claim 10, further comprising:

a first output capacitor coupled between the first output terminal and ground; and a second output capacitor coupled between the second output terminal and ground.

12. The single-stage multiple-output switching power converter of claim 10, wherein the first rectifier comprises a first synchronous rectifier transistor, and wherein the second rectifier comprises a second synchronous rectifier transistor.

13. The single-stage multiple-output switching power converter of claim 10, wherein the first output terminal is a first USB terminal and wherein the second output terminal is a second USB terminal.

14. The single-stage multiple-output switching power converter of claim 13, wherein the first USB terminal is a first USB-PD terminal and wherein the second USB terminal is a second USB-PD terminal.

* * * * *